Patented Mar. 3, 1936

2,032,458

UNITED STATES PATENT OFFICE 2,032,458

PIGMENT

William A. Adamson, Wilmington, Del., assignor to E. I. du Pont de Nemours & Company, Wilmington, Del., a corporation of Delaware No Drawing. Application February 19, 1930, Serial No. 429,834

8 Claims. (Cl. 260—31)

This invention relates to pigments of the vat dyestuff class and methods for their treatment and production.

If vat dyes are brought into suspension in an alkaline solution of suitable concentration and sodium hydrosulfite added, they will pass into the leuco state and shortly thereafter precipitate out as the alkali salts of the leuco compounds. The alkali leuco salt may start to precipitate as soon as the leuco compound begins to form or it may not start to precipitate until all of the dye is converted to the leuco state, the exact mechanism of the reaction being dependent upon the concentration of the alkaline salts present and upon the temperature of the mixture. The precipitated alkali salt of the leuco form of the dye so produced may be separated and washed.

It is known that vat dyes of the anthracene series can be converted into a form suitable for use as pigments, by further treatment of this separated substance. When the thick paste of such a leuco salt in water and alkali is, with constant agitation subjected to the atmosphere, it is very gradually oxidized back to the original dyestuff. See U. S. P. 1,150,863, August 24, 1915 to Just et al.

This oxidation apparently takes place by a thin film of the dye forming on the surface of the leuco salt particles and this in turn being scraped off by the attrition of the other particles contacting therewith. As soon as the outer layer is removed, another layer of the dye is formed where exposed, so that eventually the entire paste is returned more or less completely to the original chemical composition in finely divided form. Dyes in this form may be used as pigments.

It is also known that aeration of the alkaline solution or suspension of the leuco compound will produce vat dyes in a fine state of subdivision. In this process, however, the oxidation is incomplete. Due to the slow action of air, the leuco salt finds time to precipitate before it has been oxidized, and the precipitate consists mostly of the leuco salt in crystalline form. Moreover, these crystals become covered with a surface layer of dyestuff, which acts as a protective shell and inhibits further oxidation.

It is an object of this invention to produce vat dyes and like compounds in a fine state of subdivision and of improved characteristics over those obtainable by heretofore known processes. Another object is to utilize as color material, substances which may be chemically related to vat dyes but which have not been so used because the color they impart to fabrics is easily removable, for instance as by washing with water. Other and further important objects of this invention will appear as the description proceeds.

These objects are accomplished by the following invention wherein a color material is vatted under such conditions that the precipitation of the hydro compound is delayed for a definite interval of time. Before allowing such salting out to take place, a rapid separation of the color material is induced. This separation may take place in the presence or absence of a substratum.

According to this invention an oxidizing agent such as meta-nitro-benzene-sodium-sulfonate or sodium perborate, is added to the leuco suspension shortly after the addition of the sodium hydrosulfite to expedite the precipitation of the color material at a rapid pace. In this way the color material is thrown out in a state of fine subdivision before the crystalline form of its leuco salt can be formed. This material is of greater uniformity and brilliance than that formed in either of the above described prior art processes. Furthermore, it has the advantage of greater covering power. If at the time, when in the process of this invention the oxidizing agent is added, a base or substratum, such as lithopone, is also added, the color material separates in its finely divided form as before and apparently coats the particles of the substratum. The resultant product is a colored substance having still further increased covering power. If the solution contains a binder such as an aluminum hydroxide floc, this tends to bind the color material to the substratum particles more securely and a still further improved product is obtained.

It is advantageous but not essential to have the particles thoroughly wetted before adding the sodium hydrosulphite. This may be accomplished by continuous agitation and may be expedited by the use of a wetting agent. The use of a protective colloid or dispersing agent in the alkaline suspension gives beneficial results, but this is not necessary to the success of the process. In certain instances it may be advantageous to carry out the separation in the presence of additional salting out agents such as sodium chloride or aluminum sulfate. The latter compound may furnish the aluminum hydroxide floc referred to above.

The invention will be readily understood by consideration of the following specific examples:—

*Example I*

Twenty-five parts of Ponsol blue R ("Colour

Index" 1106—Indanthrone) powder are suspended in 3000 parts of water and 120 parts of sodium hydroxide are added. The mixture is heated to 70° C., and 25 parts sodium hydrosulphite are added. After three minutes a solution of 42 parts of metanitrobenzene-sodium-sulphonate in 350 parts of water heated to 70° C. is added to the vat. The color is thrown out at once, and the charge is digested for fifteen minutes at 70° C., filtered, washed free from alkali and pasted.

Example II

Fifty parts Ponsol blue GD ("Colour Index" 1113) (acid pasted) are suspended in 5000 parts water. Fifty parts of potassium hydroxide are added. The temperature of the charge is adjusted at 35° C., and 50 parts sodium hydrosulphite are added. The mixture is digested for 15 minutes, after which a solution of m-nitrobenzene-sodium-sulphonate in 800 parts water is added. The charge is worked up as in Example I.

Example III

Twenty-five parts Sulfanthrene pink FF ("Colour Index" 1211) was suspended in 1800 parts water. One hundred twenty (120) parts sodium hydroxide was added and the temperature of the charge raised to 95° C. Fifty parts of sodium hydrosulphite was added, and after one minute there was added a mixture of 84 parts meta-nitrobenzene-sodium-sulphonate, 50 parts aluminum sulphate, 62.5 parts barytes in 800 parts water heated to 85° C. Sulphuric acid was added to the point of neutrality, the charge filtered, washed and pasted.

Example IV

Twenty-five parts Ponsol yellow G ("Colour Index" 1118) was suspended in 1800 parts water, twenty-five parts sodium hydroxide added and the temperature of the charge brought to 40° C. Twenty-five parts of sodium hydrosulphite was added and after four minutes there was added a mixture of 75 parts sodium perborate, 58 parts aluminum sulphate, 62.5 parts barytes in 800 parts water. The charge was digested at 40–45° C. for 20 minutes, filtered, washed and pasted.

Example V

Thirty-seven and one-half (37½) parts casein was suspended in 2500 parts water and 30 parts sodium hydroxide added. The mixture was heated to 50° C. and 12.5 parts Ponsol blue R powder added. The temperature of the charge was raised to 70° C. and 12.5 parts sodium hydrosulphite was added. After the sodium hydrosulphite had reacted for four minutes a mixture of 89 parts aluminum sulphate and 21 parts sodium nitrobenzene meta sulphonate dissolved in 500 parts of water was added. The precipitated dye was filtered off, washed and pasted.

Example VI

Twenty-five (25) parts Ponsol blue R powder was suspended in 3000 parts water and 120 parts sodium hydroxide added, followed by the addition of 1 part soap chips. The temperature of the charge was raised to 70° C. and 25 parts sodium hydrosulphite was added. After four minutes a solution of 42 parts sodium nitrobenzene meta sulphonate dissolved in 350 parts water was added and this was followed by the addition of 1.5 parts soap chips. The dye was filtered off, washed and pasted.

Example VII

Twelve and five-tenths (12.5) parts halogenated $\mu$-phenyl-1,2-anthraquinone-thiazole (prepared by halogenating $\mu$-phenyl-1,2-anthraquinone-thiazole) was suspended in 700 parts water. Twelve and five-tenths (12.5) parts sodium hydroxide was added and the suspension brought to 40° C. Twelve and five-tenths (12.5) parts sodium hydrosulphite were added and allowed to react for 4 minutes at 40° C. then a mixture consisting of 21 parts meta-nitrobenzene-sodium-sulphonate, 31.3 parts barytes and 24 parts aluminum sulphate in 300 parts of water was added. The excess of alkali was neutralized with sulphuric acid and the charge filtered and washed with hot water. The residual filter cake was pasted.

While this invention is applicable to a great many classes of compounds, the vat dyes in particular are advantageously so treated. Especially good results have been obtained with the dyes of the anthracene and the thioindigo series. In addition to the dyes given in the specific examples other members of the general class which are especially suitable are: Ponsol yellow AR ("Colour Index" 1132), Ponsol brown AR ("Colour Index" 1151) and Ponsol black B ("Colour Index" 1102).

Colored compounds not heretofore considered suitable for dyes, but reacting similarly, are also made use of.

As an example of the non-dyeing color materials utilizable in this process mention is made of halogenated $\omega$-phenyl-1,2-anthraquinone-thiazole; see Example VII supra.

In cases where a substratum is not present during precipitation of the color material, the precipitated substance may later be mechanically mixed with a substratum with good results.

It will be obvious that as the substratum any of the materials generally usable in the art for such purposes may be selected; for instance: alumina, barytes, whiting, silica, clay, kaolin, talc, asbestos, magnesium carbonate and zinc white.

While the specific dispersing agents or protective colloids set out in the examples above are casein and soap other agents may be used, for example, cellulose sulfite waste liquor, sodium chollate, etc.

The process described above increases the covering power and brilliance and changes the shade of the color material in such a way as to render it particularly valuable as a pigment and for use in pulp in paper printing and paper coating. The pigment dyes produced in accordance with the process of the invention, either with or without a substratum, are characterized by being insoluble in water and in dilute acids and akalis, slightly, soluble in boiling nitrobenzene, and soluble in alkaline hydrosulphite solution. Furthermore, they are substantially amorphous and possess a different shade from colored materials produced by the aeration or air oxidation of the alkaline solution or suspension of the leuco compound according to the usual practise. Thus, indanthrone, Color Index 1106, prepared in accordance with the present invention, possesses a less reddish tint of blue than the product obtained by precipitating indanthrone from its alkaline vat by means of a current of air. Moreover, as already indicated, the colored materials are characterized, in general, by greater brilliancy and more covering power than those obtained by prior art processes involving precipitation of a color from its alkaline vat by means of a current of air. Wall paper printed with pulps containing these vat color pigments are light-fast to a greater degree than are those using the ordinary earth colors and lake-pigments, and in addition they are not susceptible to the influence of the alkali in newly plastered walls.

It will be understood that while I have inserted certain theories above to explain the nature of my observations, my invention does not depend on such theories and is not to be construed as limited thereby.

In the claims below it should be understood that where I speak of substantive oxidizing agents, I am referring to such oxidizing agents as may be handled in substance, or bulk, as opposed to air or other gaseous oxidizing agents which cannot be handled in bulk. Also the word "mild" when used in conjunction with an oxidizing agent should be understood as referring to the manner in which the oxidizing agent affects the dyestuff. More particularly, the phrase "mild oxidizing agent" is to be understood as referring to an oxidizing agent which is not so powerful as to oxidize or destroy the dyestuff after it has been converted from the leuco form into the keto form.

As many apparently widely different embodiments of this invention may be made without departing from the spirit and scope thereof, it is to be understood that I do not limit myself to the specific embodiments thereof except as defined in the appended claims.

I claim:

1. The process of preparing colored substances which comprises forming an alkaline suspension of color material of such concentration that the alkali leuco salt of the color material would separate in a short time upon the addition of an alkali hydrosulfite, adding an alkali hydrosulfite, but before the leuco salt can separate, adding an alkali-soluble aromatic nitro-compound whereby to promote separation of the coloring matter from the suspension mixture without substantial formation of a leuco salt and thereafter separating the colored substance.

2. The process which comprises suspending about twenty-five parts of indanthrone in about three thousand parts of water and adding an alkali metal hydroxide in an amount equivalent to about one hundred twenty parts of sodium hydroxide, thereafter heating to about 70° C. and adding an alkali metal hydrosulphite in an amount equivalent to about twenty-five parts of sodium hydrosulphite, in a few minutes thereafter adding an alkali-soluble meta-nitro-benzene-sulfonate in water at about 70° C. in an amount equivalent to about forty-two parts of meta-nitro-benzene-sodium-sulphonate in about three hundred fifty parts of water and digesting the resulting charge for several minutes at about 70° C.

3. The process of preparing finely divided vat colors which comprises forming an alkaline solution of a leuco compound of a vat color of such concentration that a leuco salt would normally separate therefrom in a short time and adding to said solution meta-nitro-benzene-sodium-sulfonate, whereby the insoluble vat color precipitates without substantial formation of a solid leuco salt.

4. A process for preparing a pigment, which comprises forming a substantially saturated vat of a vattable colored organic compound, allowing the same to stand to the point of incipient crystallization of the leuco form of the compound, and then adding a rapidly acting mild oxidizing agent, whereby to precipitate the compound in keto form prior to its crystallization in leuco form to any substantial degree.

5. A pigment of the vat coloring matter class, being substantially identical with the product obtained according to claim 3, and being differentiated over other pigments derivable from the same vat coloring matter by increased brilliance and spreading power.

6. An indanthrone pigment being substantially identical with the product obtainable according to the process of claim 2, and being differentiated from other pigments derivable from indanthrone, by greater brilliance, less reddish shade of blue, and increased tinctorial strength.

7. The process of preparing finely divided vat colors of the anthracene series, which comprises forming an alkaline solution of a leuco compound of the corresponding vat color of such concentration that a leuco salt would normally separate therefrom in a short time and adding to said solution meta-nitro-benzene - sodium - sulfonate, whereby the insoluble vat color precipitates without substantial formation of a solid leuco salt.

8. A pigment of the vat coloring matter class of the anthracene series, being substantially identical with the product obtained according to claim 7, and being differentiated over other pigments derivable from the same vat coloring matter by increased brilliance and spreading power.

WILLIAM A. ADAMSON.